United States Patent
Forssell et al.

(10) Patent No.: US 10,259,307 B2
(45) Date of Patent: Apr. 16, 2019

(54) HYBRID VEHICLE WITH COMPACT DRIVELINE

(71) Applicant: VOLVO CAR CORPORATION, Gothenburg (SE)

(72) Inventors: Jonas Forssell, Torslanda (SE); Mathias Jorgensson, Stenungsund (SE); Tobias Stalfors, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 375 days.

(21) Appl. No.: 15/350,354

(22) Filed: Nov. 14, 2016

(65) Prior Publication Data

US 2017/0136866 A1    May 18, 2017

(30) Foreign Application Priority Data

Nov. 17, 2015   (EP) .................................... 15194883

(51) Int. Cl.
*B60K 6/10* (2006.01)
*B60K 6/28* (2007.10)
(Continued)

(52) U.S. Cl.
CPC ................... *B60K 6/30* (2013.01); *B60K 1/00* (2013.01); *B60K 6/105* (2013.01); *B60K 6/24* (2013.01);
(Continued)

(58) Field of Classification Search
CPC ............ B60K 6/28; B60K 6/30; B60K 6/105
See application file for complete search history.

(56) References Cited

U.S. PATENT DOCUMENTS 9,284,882 B2 *   3/2016   Kasuya ................. F16D 25/123
9,528,436 B2 *  12/2016   Kasuya .................. F02B 63/04
(Continued)

FOREIGN PATENT DOCUMENTS

DE      20000343 U1    3/2000
EP       2529969 A1   12/2012
WO    2015052389 A1    4/2015

OTHER PUBLICATIONS

Extended European Search Report dated May 30, 2016, Application No. 15194883.3-1752, Applicant Volvo Car Corporation, 7 Pages.

*Primary Examiner* — Ha Dinh Ho
(74) *Attorney, Agent, or Firm* — Brooks Kushman P.C.

(57) ABSTRACT

A hybrid vehicle comprises an internal combustion engine, a transmission, at least one driving wheel rotationally connected to the transmission, and a coupling arrangement arranged between the internal combustion engine and the transmission, and controllable between a first state in which a drive shaft of the engine is rotationally connected to the transmission and a second state in which the drive shaft of the engine is rotationally disconnected from the transmission. The vehicle further comprises an energy recovery device connected to the coupling arrangement via a flexible driving member for allowing recovery and storage of energy recovered from deceleration of the at least one driving wheel. The vehicle may further comprise a sensor for sensing a parameter value indicative of desired deceleration, and a control unit for controlling the coupling arrangement to the second state when the sensed parameter value indicates desired deceleration of the hybrid vehicle.

19 Claims, 2 Drawing Sheets

(51) Int. Cl.
| | |
|---|---|
| *B60K 6/30* | (2007.10) |
| *B60K 6/24* | (2007.10) |
| *B60K 6/26* | (2007.10) |
| *B60K 6/36* | (2007.10) |
| *B60K 6/387* | (2007.10) |
| *B60K 6/48* | (2007.10) |
| *B60K 6/543* | (2007.10) |
| *B60K 1/00* | (2006.01) |
| *B60K 17/02* | (2006.01) |
| *B60W 10/02* | (2006.01) |
| *F16D 13/00* | (2006.01) |
| *F16D 13/22* | (2006.01) |

(52) U.S. Cl.
CPC .................. *B60K 6/26* (2013.01); *B60K 6/28* (2013.01); *B60K 6/36* (2013.01); *B60K 6/387* (2013.01); *B60K 6/48* (2013.01); *B60K 6/543* (2013.01); *B60K 17/02* (2013.01); *B60W 10/02* (2013.01); *F16D 13/00* (2013.01); *F16D 13/22* (2013.01); *B60K 2006/4808* (2013.01); *B60K 2006/4825* (2013.01); *B60W 2540/12* (2013.01); *B60Y 2200/92* (2013.01); *B60Y 2400/112* (2013.01); *B60Y 2400/114* (2013.01); *B60Y 2400/424* (2013.01); *B60Y 2400/428* (2013.01); *B60Y 2400/72* (2013.01); *F16D 2300/26* (2013.01); *Y02T 10/6204* (2013.01); *Y02T 10/6221* (2013.01); *Y02T 10/6252* (2013.01); *Y02T 10/6282* (2013.01); *Y02T 10/92* (2013.01); *Y10S 903/96* (2013.01)

(56) References Cited

U.S. PATENT DOCUMENTS

| | | | | |
|---|---|---|---|---|
| 2008/0011529 | A1* | 1/2008 | Hoher | B60K 6/365 180/65.23 |
| 2009/0283344 | A1* | 11/2009 | Arnold | B60K 6/26 180/65.22 |
| 2011/0121692 | A1* | 5/2011 | Iwase | B60K 6/40 310/67 R |
| 2011/0240431 | A1* | 10/2011 | Iwase | B60K 6/26 192/3.29 |
| 2012/0032538 | A1 | 2/2012 | Kasuya et al. | |
| 2012/0080248 | A1* | 4/2012 | Kasuya | B60K 6/40 180/65.21 |
| 2012/0080286 | A1* | 4/2012 | Kasuya | B60K 6/40 192/113.3 |
| 2012/0319514 | A1* | 12/2012 | Iwase | B60K 6/40 310/78 |

* cited by examiner

HYBRID VEHICLE WITH COMPACT DRIVELINE

CROSS-REFERENCE TO RELATED APPLICATIONS

This application claims foreign priority benefits under 35 U.S.C. § 119(a)-(d) to European patent application number EP 15194883.3, filed Nov. 17, 2015, which is incorporated by reference in its entirety.

TECHNICAL FIELD

The present disclosure relates to a hybrid vehicle with an energy recovery device connected to at least one driving wheel via a transmission.

BACKGROUND

Hybrid vehicles using a combination of an internal combustion engine (ICE), an auxiliary drive source, and an energy storage unit are becoming more and more popular, due to their more efficient use of energy. In particular, the ICE can be operated intermittently and/or in a favorable operating regime, and braking energy can be recovered and stored for later use. The braking energy can be recovered and stored by an energy recovery device.

For efficient recovery of braking energy, it is desirable to transfer the braking energy substantially only to the energy recovery device and not to use braking energy for rotating the ICE. On the other hand, at least for hybrid vehicles of the parallel hybrid type, the ICE needs to be able to drive the driving wheels through the transmission.

Furthermore, it would be desirable to maintain flexibility in the vehicle design, for example in respect of type of transmission, ICE and energy recovery device, etc., while still fulfilling the often very severe space constraints of a modern car.

There is thus a need for hybrid vehicle with a very compact solution for allowing controllable torque transmission between the ICE and the transmission in such a way that the transmission can drive the energy recovery device during deceleration, and the ICE as well as the energy recovery device can drive the transmission during acceleration.

SUMMARY

In view of above-mentioned and other drawbacks of the prior art, it is an object of the present disclosure to provide a hybrid vehicle with a very compact solution for allowing controllable torque transmission between the ICE and the transmission in such a way that the transmission can drive the energy recovery device during deceleration, and the ICE as well as the energy recovery device can drive the transmission during acceleration.

According to the present disclosure, it is therefore provided a hybrid vehicle comprising: an internal combustion engine operable to rotate a drive shaft of the internal combustion engine; a transmission; at least one driving wheel rotationally connected to the transmission; a coupling arrangement arranged between the internal combustion engine and the transmission for controllably rotationally connecting the drive shaft of the internal combustion engine with the transmission to provide torque to the at least one driving wheel via the transmission, the coupling arrangement being controllable between a first state in which the drive shaft of the internal combustion engine is rotationally connected to the transmission and a second state in which the drive shaft of the internal combustion engine is rotationally disconnected from the transmission; and an energy recovery device having a shaft being rotationally connected to the coupling arrangement via a flexible driving member for allowing recovery and storage of energy recovered from deceleration of the at least one driving wheel.

In the second state (as well as in the first state) of the coupling arrangement, the shaft of the energy recovery device is connected to the transmission via the coupling arrangement. Accordingly, the energy recovery device can be controlled to supply energy to the at least one driving wheel during acceleration or coasting, and may recover and store braking energy during deceleration of the hybrid vehicle.

The transmission may be any kind of transmission for transmitting torque from the ICE to the driving wheels, such as a manual or automatic gearbox or a continuously variable transmission.

According to embodiments, the hybrid vehicle of the disclosure may further comprise a sensor for sensing a parameter value indicative of desired deceleration of the at least one driving wheel; and a control unit connected to the sensor and to the coupling arrangement for controlling the coupling arrangement to the second state when the sensed parameter value indicates desired deceleration of the hybrid vehicle.

A parameter value indicative of desired deceleration of the driving wheels may be a value of a control signal indicating that the user releases the accelerator, or that a cruise control system signals a decreased power output from the ICE, etc.

The present disclosure is based on the realization that a compact and flexible driveline solution can be achieved in combination with energy-efficient recovery of brake energy by providing a controllable coupling arrangement between the ICE and the transmission and connecting the coupling arrangement and an energy recovery device using a flexible driving member, such as a belt or a chain. In this manner, the ICE can be disconnected from the transmission when brake energy is recovered and stored in the energy recovery device, and the energy recovery device can be arranged "off-axis" so that the increase in the length of the ICE-transmission assembly can be kept at a minimum.

Accordingly, embodiments of the present disclosure provide for a more compact brake energy recovery solution, in particular in the direction along the drive shaft, which in turn provides for increased flexibility in the configuration of the hybrid vehicle.

Although driving the energy recovery device with a flexible member provides for a more compact solution in itself, designing the coupling arrangement to extend in the radial direction rather in the axial direction thereof provides for further space saving in the critical length direction of the ICE-transmission assembly.

According to embodiments of the present disclosure, the coupling arrangement may therefore comprise a first rotatable member rotatable about a rotational axis and connected to the drive shaft of the internal combustion engine, the first rotatable member comprising a first friction clutch member; a second rotatable member rotatable about the rotational axis and connected to the transmission and to the energy recovery device via the flexible driving member, the second rotatable member comprising a second friction clutch member; a stationary member; a first bearing arranged between the first rotatable member and the second rotatable member to allow relative rotation between the first rotatable member and the second rotatable member; a second bearing between one of the first rotatable member and the second rotatable member, and the stationary member to allow relative rotation between each of the first and second rotatable members and the stationary member; and an actuator controllable to release the first friction clutch member from the second friction clutch member to allow the second rotatable member to rotate in relation to the first rotatable member, to thereby transition the coupling arrangement from the first state to the second state, wherein the first bearing, the second bearing and the first and second friction clutch members are concentrically arranged.

Through the concentric arrangement of the first and second bearings and the first and second friction clutch members, the axial dimension of the coupling arrangement can be reduced substantially, contributing to the desired compact and flexible ICE-transmission assembly.

In particular, the first bearing, the second bearing and the first and second friction clutch members may be arranged radially outside each other in a plane perpendicular to the rotational axis.

According to various embodiments, furthermore, the first bearing may be arranged closer to the rotational axis than the second bearing, and the second bearing may be arranged closer to the rotational axis than the first and second friction clutch members.

To further provide for the desired compact solution, while still providing for efficient connection and disconnection of the ICE and the transmission, the first rotatable member may comprise a primary flywheel attached to the drive shaft of the internal combustion engine; a secondary flywheel comprising the first friction clutch member; and at least one peripheral spring connecting the primary flywheel and the secondary flywheel.

Through the use of a so-called dual mass flywheel as the first rotatable member the torque function (over time) provided by the ICE to the first friction clutch member is smoothed so that torque variations become far less sudden. This provides for the use of more compact friction clutch members and actuator, which in turn provides for a more compact and/or durable coupling arrangement.

According to embodiments, the primary flywheel may comprise a radially facing first elongated recess; the secondary flywheel may comprise a second elongated recess opposite the first elongated recess; and a ball may be accommodated in the first elongated recess and the second elongated recess for restricting axial movement of the secondary flywheel in relation to the primary flywheel.

Hereby, unwanted relative axial movement between the primary flywheel member and the second flywheel member can be prevented when the coupling arrangement is operated (the actuator releases the first friction clutch member from the second friction clutch member). Furthermore, this effect can be obtained in a very compact manner.

Advantageously, the primary flywheel may comprise a plurality of radially facing first elongated recesses; the secondary flywheel may comprise a plurality of second elongated recesses, each being arranged opposite a corresponding one of the first elongated recesses; and a ball may be accommodated in one of the first elongated recesses and a corresponding one of the second elongated recesses for restricting relative axial movement of the secondary flywheel in relation to the primary flywheel.

In summary, according to various embodiments the present disclosure relates to a hybrid vehicle comprising an internal combustion engine; a transmission; at least one driving wheel rotationally connected to the transmission; a coupling arrangement arranged between the internal combustion engine and the transmission, and controllable between a first state in which the drive shaft of the internal combustion engine is rotationally connected to the transmission and a second state in which the drive shaft of the internal combustion engine is rotationally disconnected from the transmission. The hybrid vehicle further comprises an energy recovery device connected to the coupling arrangement via a flexible driving member for allowing recovery and storage of energy recovered from deceleration of the at least one driving wheel; a sensor for sensing a parameter value indicative of desired deceleration; and a control unit for controlling the coupling arrangement to the second state when the sensed parameter value indicates desired deceleration of the hybrid vehicle.

BRIEF DESCRIPTION OF THE DRAWINGS

These and other aspects of the present disclosure will now be described in more detail, with reference to the attached drawings.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
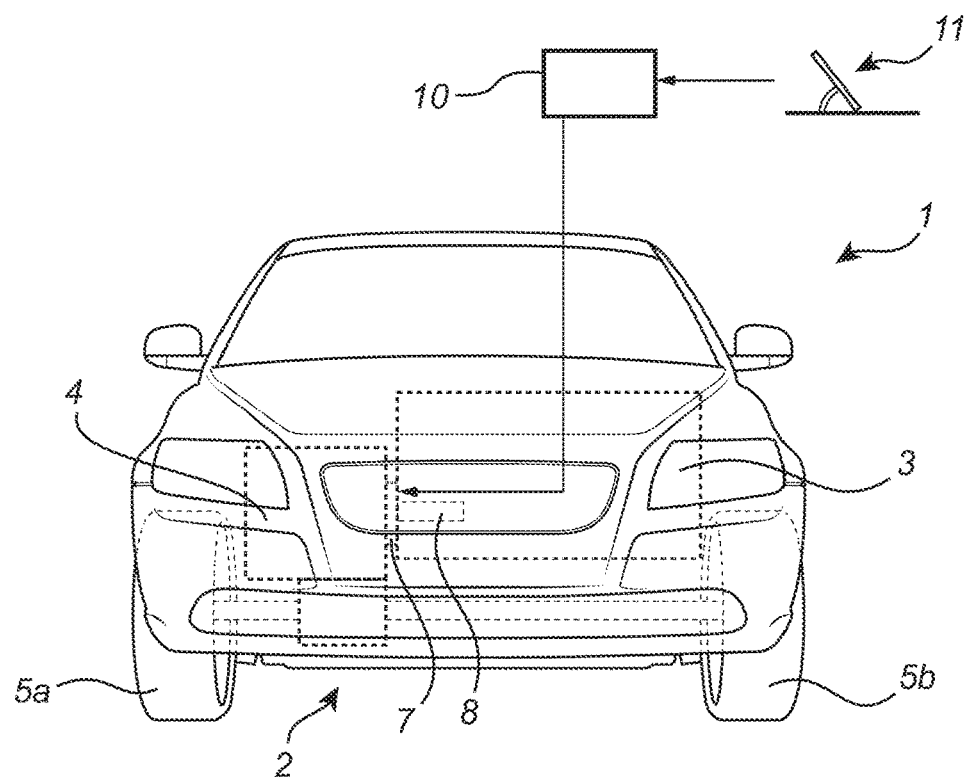
FIG. 1 schematically shows a hybrid vehicle according to an example embodiment of the present disclosure.

FIG. 1 schematically shows a hybrid vehicle in the form of a car 1 with a very schematic driveline 2 indicated with dashed lines to illustrate the limited available transversal space in the body of a modern car.

As is schematically illustrated in FIG. 1, the driveline 2 comprises an internal combustion engine (ICE) 3, a transmission 4, driving wheels 5a b, a coupling arrangement 7, and an energy recovery device 8.

The coupling arrangement 7 is arranged between the ICE 3 and the transmission 4 for controllably rotationally connecting the drive shaft (not shown in FIG. 1) of the ICE 3 with the transmission 4 to proved torque from the ICE 3 to the driving wheels 5a b.

As will be described in greater detail below with reference to FIG. 2 and FIG. 3, the energy recovery device 8 is rotationally connected to the coupling device 7 via a flexible driving member (not shown in FIG. 1) to allow the energy recovery device 8 to drive the driving wheels 5a b via the transmission 4, and to allow the energy recovery device 8 to help retard the driving wheels 5a b to recover braking energy when deceleration of the car 1 is desired.

As is well known to the skilled person, the energy recovery device may comprise a flywheel and/or an electric generator, and recovered energy may be stored in the rotation of the flywheel and/or as electrical energy in an electrical energy storage device, such as a battery or a supercapacitor.

Referring again to FIG. 1, the car 1 additionally comprises a control unit 10 connected to the coupling arrangement 7 and to a sensor for sensing a parameter indicative of desired deceleration of the car 1. In the exemplary case shown in FIG. 1, the sensor is schematically illustrated to sense a position of the accelerator pedal 11. When the driver removes her/his foot from the accelerator pedal 11, this is one indication that deceleration is desired. Obviously, there are many other parameters that may indicate desired deceleration, for instance operation of the brake pedal, control signals from a cruise control system, etc.

To provide for rational development of new car models and diversification within the model program, it is desirable to be able to combine different ICEs 3 and transmissions 4 within the constraints given by the car body design. To that end, it is highly desirable to provide for a selectively engageable energy recovery device with a minimum extension of the ICE-transmission arrangement in the transversal direction. This is achieved through embodiments of the present disclosure as described herein.

Figure 2:
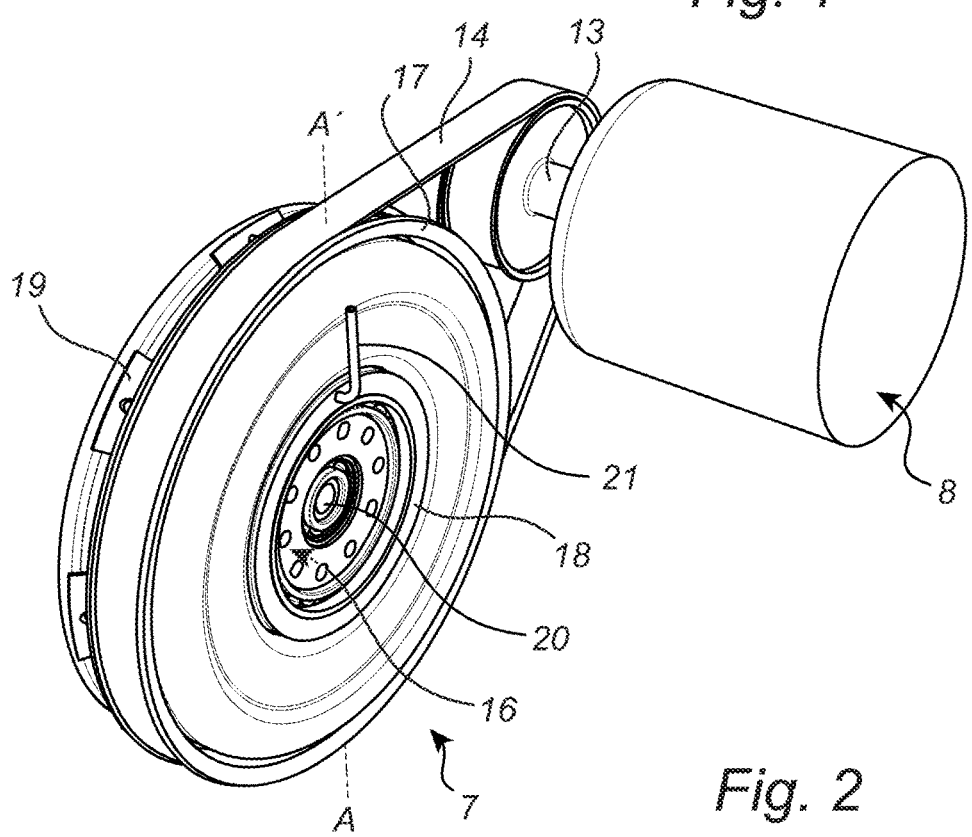
FIG. 2 is a perspective view of the coupling arrangement and energy recovery device comprised in the hybrid vehicle in FIG. 1.

Referring now to FIG. 2, the above-mentioned desired minimum extension in the transversal direction of the ICE-transmission arrangement is achieved by rotationally connecting the shaft 13 of the energy recovery device 8 to the coupling arrangement 7 via a flexible driving member, here illustrated as a belt 14. It should be noted that the flexible driving member may alternatively be provided in the form of a chain.

The coupling arrangement 7, which will be described in greater detail below with reference to FIG. 3, comprises a first rotatable member 16 connected to the drive shaft of the ICE 3, a second rotatable member 17, and a stationary member 18. The second rotatable member 17 is connected to the transmission 4 and to the shaft 13 of the energy recovery device via the belt 14.

The second rotatable member 17 is configured to allow connection to different kinds of transmissions. As can be seen in FIG. 2, the second rotatable member 17 comprises a so-called flexplate 19 for connection to an automatic gearbox, and a central sleeve 20 for connection to a manual gearbox.

As is schematically shown in FIG. 2, the transmission 4 and the energy recovery device 8 are permanently connected via the second rotatable member 17 and the belt 14. The drive shaft of the ICE 3 and the transmission 4 (and the energy recovery device 8) can be disconnected from each other by rotationally decoupling the first rotatable member 16 and the second rotatable member 17 from each other using an actuator. In the example embodiment of FIG. 2, the actuator is a hydraulic actuator supplied with hydraulic fluid through pipe 21. The supply of hydraulic fluid for operating the hydraulic actuator may be controlled by the control unit 10 in FIG. 1 in response to a signal indicating that deceleration of the car 1 is desired, as described above.

Figure 3:
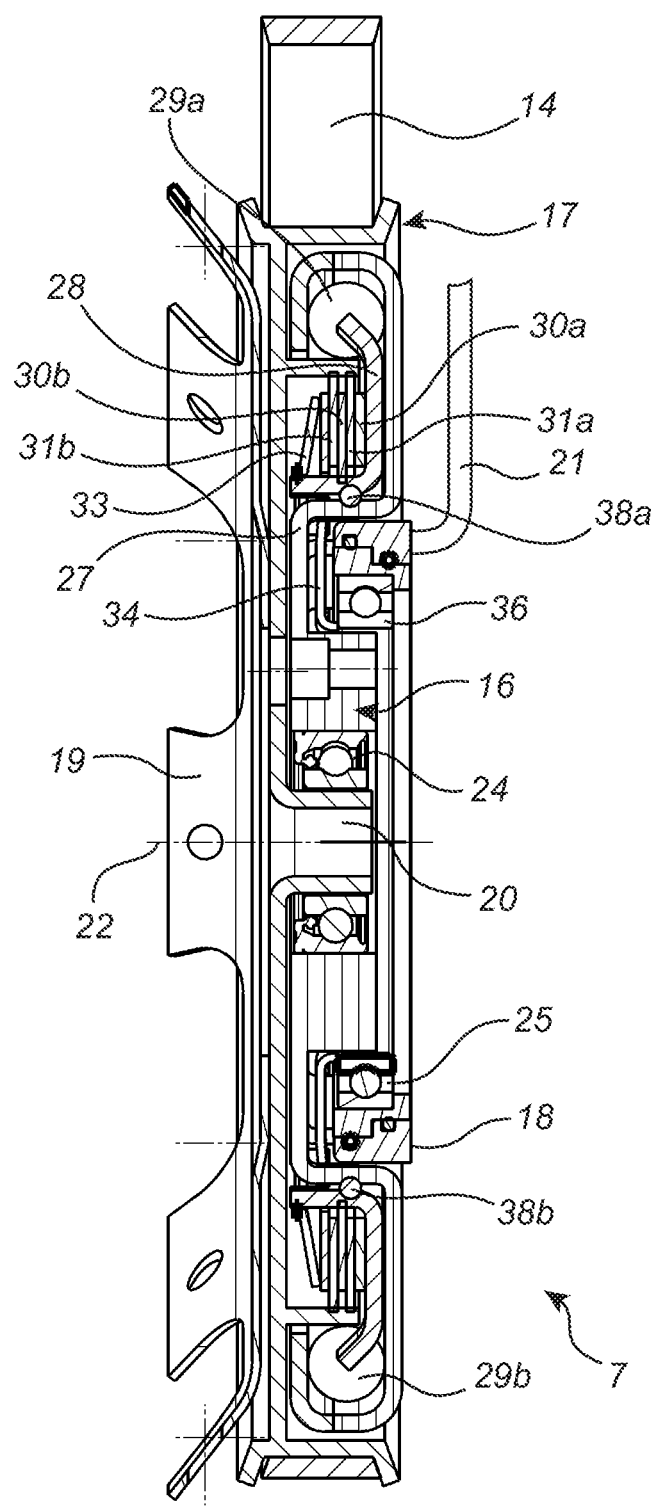
FIG. 3 is cross-section view of the coupling arrangement in FIG. 2.

In FIG. 3, the coupling arrangement 7 is shown in cross-section along the line A-A' in FIG. 2. Referring to FIG. 3, the first rotatable member 16 and the second rotatable member 17 are both arranged to be rotatable about a rotational axis 22.

A first bearing 24 is arranged between the first rotatable member 16 and the second rotatable member 17 to allow relative rotation between the first rotatable member 16 and the second rotatable member 17.

Analogously, a second bearing 25 is arranged between the first rotatable member 16 and the stationary member 18.

In the example embodiment of FIG. 3, the first rotatable member 16 is provided in the form of a so-called dual mass flywheel, comprising a primary flywheel 27, a secondary flywheel 28 and a plurality of springs 29a b connecting the primary flywheel 27 and the secondary flywheel 28.

The first rotatable member 16 (specifically the secondary flywheel 28) comprises a first friction clutch member, here in the form of first friction plates 30a b, and the second rotatable member 17 comprises a second friction clutch member, here in the form of second friction plates 31a b.

When the coupling arrangement 7 is engaged, so that the first 16 and second 17 rotatable members rotate together, the first friction plates 30a b and the second friction plates 31a b are pressed together by diaphragm spring 33 via pressure fingers 34 arranged between the diaphragm spring 33 and the interleaved friction plates.

As can be seen in FIG. 3, the diaphragm spring 33 can be pushed away from the interleaved friction plates by moving the pressure fingers 34 towards the left in FIG. 3. This is achieved by the hydraulic actuator pushing the inner ring 36 of the second bearing 25 towards the left in FIG. 3. When the diaphragm spring 33 is pushed away from the interleaved friction plates, the coupling arrangement 7 is disengaged, so that the first 16 and second 17 rotatable members may rotate in relation to each other.

To prevent the second flywheel 28 of the first rotatable member 16 from moving axially (in a direction parallel to the rotational axis 22) when the diaphragm spring 33 is pushed away by the pressure fingers 34, balls 38a-b are provided between the primary flywheel 27 and the secondary flywheel 28 to allow the primary 27 and secondary 28 flywheels to rotationally "rock" in relation to each other, but be restricted in the axial direction.

Through a configuration of the coupling arrangement such as that described above with reference to FIG. 3, with the first bearing 24, the second bearing 25 and the first 30a b and second 31a b friction clutch members concentrically arranged in a plane perpendicular to the rotational axis 22, the coupling arrangement 7 becomes extremely compact in the axial direction.

The person skilled in the art realizes that the present disclosure by no means is limited to the embodiments described above. On the contrary, many modifications and variations are possible within the scope of the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

Furthermore, a single processor or other unit may fulfill the functions of several items recited in the claims. In that regard, as one skilled in the art would understand, the control unit 10, for example, may include one or more processors (e.g., one or more microprocessors, microcontrollers and/or programmable digital signal processors) in communication with, or configured to communicate with, one or more storage devices or media including computer readable program instructions that are executable by the one or more processors so that the control unit 10 may perform particular algorithms represented by the functions and/or operations described herein.

What is claimed is:

1. A hybrid vehicle comprising:
an internal combustion engine including a rotatable drive shaft;
a transmission;

at least one driving wheel rotationally connected to the transmission;

a coupling arrangement arranged between the internal combustion engine and the transmission for controllably rotationally connecting the drive shaft of the internal combustion engine with the transmission to provide torque to the at least one driving wheel via the transmission, the coupling arrangement being controllable between a first state in which the drive shaft of the internal combustion engine is rotationally connected to the transmission and a second state in which the drive shaft of the internal combustion engine is rotationally disconnected from the transmission; and an energy recovery device having a shaft rotationally connected to the coupling arrangement via a flexible driving member to thereby rotationally connect the shaft of the energy recovery device to the transmission for allowing recovery and storage of energy recovered from deceleration of the at least one driving wheel.

2. The hybrid vehicle according to claim 1 further comprising:

a sensor for sensing a parameter value indicative of desired deceleration of the at least one driving wheel; and a control unit connected to the sensor and to the coupling arrangement for controlling the coupling arrangement to the second state when the sensed parameter value indicates desired deceleration of the hybrid vehicle.

3. The hybrid vehicle according to claim 1 wherein the coupling arrangement comprises:

a first rotatable member rotatable about a rotational axis and connected to the drive shaft of the internal combustion engine, the first rotatable member comprising a first friction clutch member;

a second rotatable member rotatable about the rotational axis and connected to the transmission and to the energy recovery device via the flexible driving member, the second rotatable member comprising a second friction clutch member;

a stationary member;

a first bearing arranged between the first rotatable member and the second rotatable member to allow relative rotation between the first rotatable member and the second rotatable member;

a second bearing between one of the first rotatable member and the second rotatable member, and the stationary member to allow relative rotation between each of the first and second rotatable members and the stationary member; and an actuator controllable to release the first friction clutch member from the second friction clutch member to allow the second rotatable member to rotate in relation to the first rotatable member, to thereby transition the coupling arrangement from the first state to the second state, wherein the first bearing, the second bearing and the first and second friction clutch members are concentrically arranged.

4. The hybrid vehicle according to claim 3 wherein the first bearing is arranged closer to the rotational axis than the second bearing, and the second bearing is arranged closer to the rotational axis than the first and second friction clutch members.

5. The hybrid vehicle according to claim 3 wherein the first bearing, the second bearing and the first and second friction clutch members are arranged radially outside each other in a plane perpendicular to the rotational axis.

6. The hybrid vehicle according to claim 5 wherein the first bearing is arranged closer to the rotational axis than the second bearing, and the second bearing is arranged closer to the rotational axis than the first and second friction clutch members.

7. The hybrid vehicle according to claim 3 wherein the first rotatable member comprises:

a primary flywheel attached to the drive shaft of the internal combustion engine;

a secondary flywheel comprising the first friction clutch member; and at least one spring connecting the primary flywheel and the secondary flywheel.

8. The hybrid vehicle according to claim 4 wherein the first rotatable member comprises:

a primary flywheel attached to the drive shaft of the internal combustion engine;

a secondary flywheel comprising the first friction clutch member; and at least one spring connecting the primary flywheel and the secondary flywheel.

9. The hybrid vehicle according to claim 5 wherein the first rotatable member comprises:

a primary flywheel attached to the drive shaft of the internal combustion engine;

a secondary flywheel comprising the first friction clutch member; and at least one spring connecting the primary flywheel and the secondary flywheel.

10. The hybrid vehicle according to claim 6 wherein the first rotatable member comprises:

a primary flywheel attached to the drive shaft of the internal combustion engine;

a secondary flywheel comprising the first friction clutch member; and at least one spring connecting the primary flywheel and the secondary flywheel.

11. The hybrid vehicle according to claim 7 wherein:

the primary flywheel comprises a radially facing first elongated recess;

the secondary flywheel comprises a second elongated recess opposite the first elongated recess; and at least one ball is accommodated in the first elongated recess and the second elongated recess, between the primary flywheel and the secondary flywheel, for restricting axial movement of the secondary flywheel in relation to the primary flywheel.

12. The hybrid vehicle according to claim 11 wherein:

the primary flywheel comprises a plurality of radially facing first elongated recesses;

the secondary flywheel comprises a plurality of second elongated recesses, each being arranged opposite a corresponding one of the first elongated recesses; and at least one of a plurality of balls is accommodated in each of the first elongated recesses and a corresponding one of the second elongated recesses, between the primary flywheel and the secondary flywheel, for restricting relative axial movement of the secondary flywheel in relation to the primary flywheel.

13. The hybrid vehicle according to claim 3 wherein the second rotatable member comprises a driving member for interacting with the flexible driving member to convert rotation of the driving member to movement of the flexible driving member, wherein the driving member is arranged at a radial periphery of the coupling arrangement.

14. The hybrid vehicle according to claim 1 wherein the shaft of the energy recovery device is substantially parallel to the drive shaft of the internal combustion engine.

15. The hybrid vehicle according to claim 1 wherein the flexible driving member is a belt.

16. The hybrid vehicle according to claim 1 wherein the flexible driving member is a chain.

17. The hybrid vehicle according to claim 1 wherein the energy recovery device comprises a flywheel.

18. The hybrid vehicle according to claim 1 wherein the energy recovery device comprises an electric generator.

19. The hybrid vehicle according to claim 1 wherein the energy recovery device comprises a hydraulic machine.

\* \* \* \* \*